US012762268B2

(12) United States Patent
Whitehead et al.

(10) Patent No.: US 12,762,268 B2
(45) Date of Patent: Oct. 13, 2026

(54) SECURE DIGITAL REGISTRATION OF CONTRACTS GOVERNING MEDIA CONTENT USE

(71) Applicant: Disney Enterprises, Inc., Burbank, CA (US)

(72) Inventors: Jonathan Whitehead, Burbank, CA (US); Mark Arana, Agoura Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 11 days.

(21) Appl. No.: 19/096,082

(22) Filed: Mar. 31, 2025

(65) Prior Publication Data

US 2025/0315542 A1 Oct. 9, 2025

Related U.S. Application Data

(60) Provisional application No. 63/575,262, filed on Apr. 5, 2024.

(51) Int. Cl.

*G06F 21/00* (2013.01)
*G06F 21/62* (2013.01)
*G06Q 30/0279* (2023.01)

(52) U.S. Cl.

CPC ..... *G06F 21/6218* (2013.01); *G06Q 30/0279* (2013.01)

(58) Field of Classification Search

CPC .. G06F 21/6218; G06F 21/10; G06F 21/1063; G06F 21/16; G06Q 30/0279

See application file for complete search history.

(56) References Cited

U.S. PATENT DOCUMENTS 7,818,261 B2 * 10/2010 Weiskopf ........... G06Q 30/0633 380/231
8,055,899 B2 * 11/2011 Levy ................... G06F 21/1063 713/176

(Continued)

FOREIGN PATENT DOCUMENTS

CN 116028900 A 4/2023

OTHER PUBLICATIONS

Shang-Lin Hseih, Chun-Che Chen, Wen-Shan Shen "Combining Digital Watermarking and fingerprinting Techniques to Identify Copyrights for Color Images" The Scientific World Journal Jul. 8, 2014 15 Pages.

*Primary Examiner* — Kendall Dolly

(74) *Attorney, Agent, or Firm* — Farjami & Farjami LLP

(57) ABSTRACT

A system includes a memory storing software code, and a hardware processor executing the software code to receive media content including a media content ID, identify, using the media content ID, one or more rule(s) governing use of the media content, the rule(s) including at least one of: (a) one or more first rules restricting use of the media content, or (b) one or more second rules permitting use of the media content, and generate, based on the rule(s), a digital contract specifying at least one of: (i) one or more constraints on use of the media content, or (ii) one or more enablements on use of the media content. The software code also registers the digital contract with the media content ID in a secure database, generates, using data identifying the secure database, a first watermark, and embeds the first watermark identifying the secure database into the media content.

20 Claims, 6 Drawing Sheets

(56) References Cited

U.S. PATENT DOCUMENTS

| | | | | |
|---|---|---|---|---|
| 10,191,996 | B2 | 1/2019 | Rhoads et al. | |
| 11,922,532 | B2 | 3/2024 | Alattar et al. | |
| 11,934,497 | B2 * | 3/2024 | Smaiely | H04N 21/2543 |
| 12,158,929 | B1 * | 12/2024 | Huang | H04L 9/0643 |
| 2007/0156726 | A1 * | 7/2007 | Levy | G06F 16/00 |
| 2009/0276619 | A1 * | 11/2009 | Collens | G06T 1/005<br>713/153 |
| 2010/0241595 | A1 * | 9/2010 | Felsher | G16H 10/65<br>707/E17.014 |
| 2020/0226233 | A1 | 7/2020 | Penugonda et al. | |
| 2023/0083893 | A1 * | 3/2023 | Craft | H04L 51/52<br>707/769 |
| 2023/0376581 | A1 * | 11/2023 | Shear | G06F 21/32 |
| 2024/0411840 | A1 * | 12/2024 | Arana | H04N 21/4627 |

* cited by examiner

SECURE DIGITAL REGISTRATION OF CONTRACTS GOVERNING MEDIA CONTENT USE

RELATED APPLICATIONS

The present application claims the benefit of and priority to a U.S. Provisional Patent Application Ser. No. 63/575,262 filed on Apr. 5, 2024, and titled "Secure Digital Registration of Contracts Governing Media Content Use," which is hereby incorporated fully by reference into the present application.

BACKGROUND

In the conventional art, rules describing how, where, when, and by whom media content can be used typically accompany the media content, in the form of metadata embedded or appended to or based on or generated from the media content, or by licensing information accompanying the media content, for example. A significant disadvantage of this conventional approach to communicating restrictions and/or permissions regarding the use of media content is that when usage rules change, as they often do, each instantiation of effected media content, i.e., each unit of distributed media content, must have its individual associated usage rules updated. Consequently, there is a need in the art for a solution enabling contracts governing media content use to be updated dynamically and globally for some or all instantiations of media content contemporaneously without requiring direct access to the media content itself.

DETAILED DESCRIPTION

Figure 1:
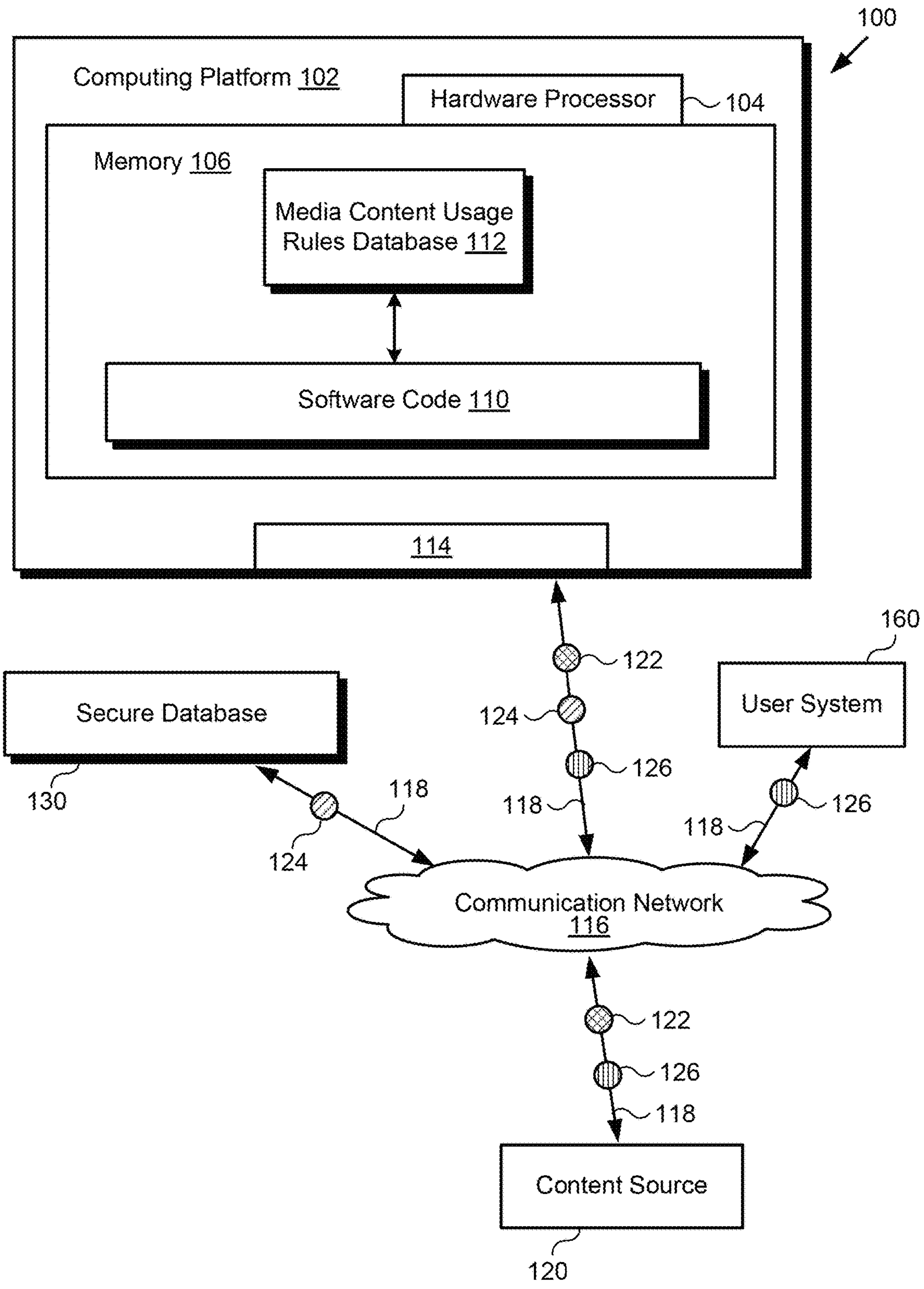
FIG. 1 shows a diagram of an exemplary system for providing secure digital registration of contracts governing media content use, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a solution for enabling contracts governing media content use to be updated dynamically and globally for some or all instantiations of media content contemporaneously without requiring direct access to the media content itself. Moreover, in some implementations, the solution for performing secure digital registration of contracts governing media content use disclosed in the present application may advantageously be implemented as automated systems and method.

As used in the present application, the terms "automation," "automated" and "automating" refer to systems and processes that do not require the participation of a human system operator. Although in some implementations the performance of the systems and methods disclosed herein may be monitored or even managed by a human system operator or administrator, that human involvement is optional. Thus, the methods described in the present application may be performed under the control of hardware processing components of the disclosed systems.

It is noted that, as defined in the present application, the term "media content" may encompass content in a wide variety of forms. Examples of media content may include a digital file containing one or more of text, an image or images, video without audio, audio without video, or audio-video (AV) content, such as all or part of a television (TV) episode, movie, or video game, to name a few. In addition, or alternatively, in some implementations, media content may be or include digital representations of persons, fictional characters, locations, objects, and identifiers such as brands and logos, for example, which populate a virtual reality (VR), augmented reality (AR), or mixed reality (MR) environment. Such media content may depict virtual worlds that can be experienced by any number of users synchronously and persistently, while providing continuity of data such as personal identity, user history, entitlements, possessions, payments, and the like. Moreover, in some implementations, media content may be or include digital content that is a hybrid of traditional audio-video and fully immersive VR/AR/MR experiences, such as interactive video.

FIG. 1 shows a diagram of exemplary system 100 for providing secure digital registration of contracts governing media content use, according to one implementation. As shown in FIG. 1, system 100 includes computing platform 102 having transceiver 114, hardware processor 104, and memory 106 implemented as a computer-readable non-transitory storage medium. According to the present exemplary implementation, memory 106 stores software code 110 and media content usage rules database 112.

As further shown in FIG. 1, system 100 is implemented within a use environment including content source 120, secure database 130, optional user system 160, communication network 116 and network communication links 118 communicatively coupling system 100, and optional user system 160, to content source 120 and secure database 130. Also shown in FIG. 1 are media content 122 provided by content source 120, digital contract 124 specifying one or more constraints and/or enablements on the use of media content 122, and watermarked media content 126 provided by system 100.

With respect to the representation of system 100 shown in FIG. 1, it is noted that although software code 110 and media content usage rules database 112 are depicted as being stored in memory 106 for conceptual clarity, more generally, memory 106 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, internal and external hard drives, optical discs, RAM, programmable read-only memory (PROM), erasable PROM (EPROM) and FLASH memory.

It is further noted that although FIG. 1 depicts software code 110 and media content usage rules database 112 as being co-located in a single instance of memory 106 that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, hardware processor 104 and memory 106 may correspond to distributed processor and memory resources of system 100. Thus, it is to be understood that software code 110 and media content usage rules database 112 may be stored remotely from one another within the distributed memory resources of system 100.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence applications such as machine-learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance to communicate with one or both of content source 120 and secure database. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC). Thus, in various implementations, communication network 112 may be or include the Internet, a WAN, a LAN, a 10 GigE network, or an Infiniband network, for example.

Transceiver 114 may be implemented as a wireless communication unit configured for use with one or more of a variety of wireless communication protocols. For example, transceiver 114 may include a fourth generation (4G) wireless transceiver and/or a 5G wireless transceiver. In addition, or alternatively, transceiver 114 may be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

Secure database 130 may take the form of a public secure database, which may include any secure or securable database. Examples of such decentralized secure digital ledgers may include a blockchain, hashgraph, directed acyclic graph (DAG), and HOLOCHAIN® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

Optional user system 160 may take the form of any suitable mobile or stationary computing device or system that implements data processing capabilities sufficient to support a user interface and connections to communication network 120, as well as to perform the functionality ascribed to user system 160 herein. That is to say, although not shown in FIG. 1, user system 160 includes one or more hardware processors, a memory storing software code, and a communications transceiver. In various implementations, user system 160 may take the form of a mainframe computer, a desktop computer, a laptop computer, a tablet computer, or a smartphone, to name a few examples.

Figure 2A:
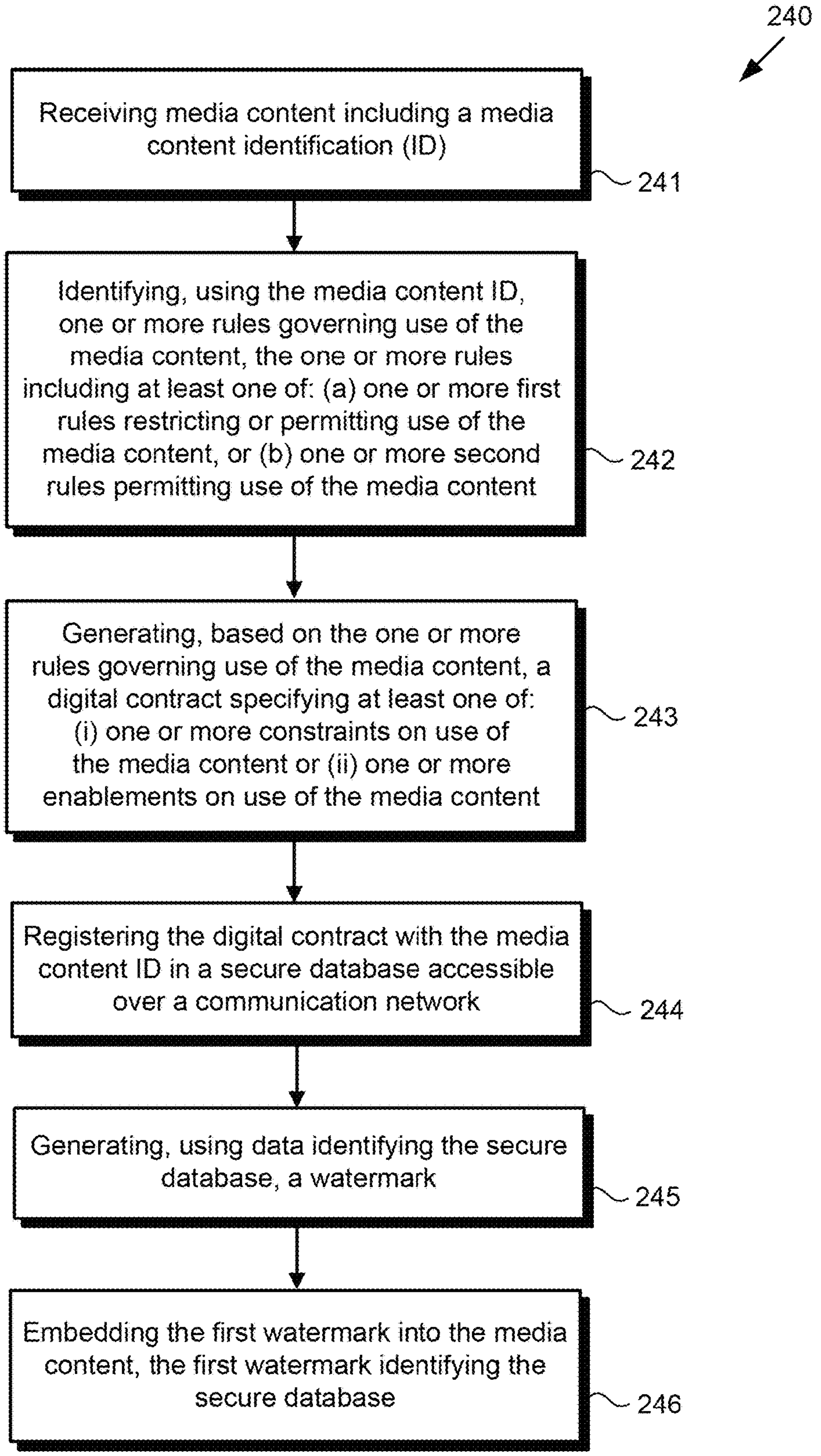
FIG. 2A shows a flowchart presenting an exemplary method for performing secure digital registration of contracts governing media content use, according to one implementation.

The functionality of system 100 and software code 110 will be further described by reference to FIG. 2A. FIG. 2A shows flowchart 240 presenting an exemplary method for performing secure digital registration of contracts governing media content use, according to one implementation. With respect to the method outlined in FIG. 2A, it is noted that certain details and features have been left out of flowchart 240 in order not to obscure the discussion of the inventive features in the present application.

Referring to FIGS. 1 and 2A in combination, flowchart 240 includes receiving media content 122 including a media content identification (ID) (action 241). As noted above, media content 122 may include a digital file containing one or more of text, an image or images, video without audio, audio without video, or AV content, such as all or part of a TV episode, movie, or video game, to name a few. In addition, or alternatively, in some implementations, media content 122 may be or include digital representations of persons, fictional characters, locations, objects, and identifiers such as brands and logos, for example, which populate a VR, AR, or MR environment. Such media content may depict virtual worlds that can be experienced by any number of users synchronously and persistently, while providing continuity of data such as personal identity, user history, entitlements, possessions, payments, and the like. Moreover, in some implementations, media content 122 may be or include digital content that is a hybrid of traditional audio-video and fully immersive VR/AR/MR experiences, such as interactive video.

The media content ID of media content 122 may be the Entertainment Identifier Registry (EIDR) identifier of media content 122, for example. Media content 122 may be received, in action 240, by software code 110, executed by hardware processor 104 of system 100. As shown in FIG. 1, in some implementations, media content 122 may be provided by content provider 120, which may be an owner, distributor, or creator of media content 122. As further shown in FIG. 1, media content 122 may be received by system 100 via communication network 116 and network communication links 118.

Continuing to refer to FIGS. 1 and 2A in combination, flowchart 240 further includes identifying, using the media content ID of media content 122, governing use of media content 122, the one or more rules including at least one of: (a) one or more first rules restricting use of media content 122, or (b) one or more second rules permitting use of media content 122 (action 242). Identification of the one or more rules governing use of media content 122, in action 242, may be performed by software code 110, executed by hardware processor 104 of system 100, and using media content usage rules database 112, which may store rules describing permissible uses of media content 122, as well as restrictions on the use of media content 122. It is noted that, in some implementations, rather than storing individual rules each describing a permissible use or a restriction on the use of media content 122 per se, media content usage rules database 112 may instead store a policy statement describing the permissible use of media content 122. Such a policy statement may itself include one or more rules restricting or permitting use of media content 122.

In some implementations, the one or more rules governing use of media content 122 and stored in media content usage rules database 112 may include rules restricting or permitting use of media content 122 by an artificial intelligence (AI) model, such as a machine-learning (ML) model. It is noted that, as defined in the present application, the expression "AI model" or "ML model" refers to a computational model for making predictions based on patterns learned from samples of data or training data. Various learning algorithms can be used to map correlations between input data and output data. These correlations form the computational model and can be used to make future predictions on new input data. Such a predictive model may include one or more logistic regression models, Bayesian models, artificial neural networks (NNs) such as transformers, large-language models (LLMs), or multimodal foundation models, to name a few examples. In various implementations, ML models may be trained as classifiers and may be utilized to perform image processing, audio processing, natural-language processing, and other inferential analyses.

By way of example, in some implementations, rules governing use of media content 122 or a policy statement stored in media content usage rules database 112 may restrict use of media content 122 as training content for an ML or other AI model, such as by prohibiting use of media content 122 as training content for an ML or other AI model. Alternatively, or in addition, in some implementations rules or a policy statement stored in media content usage rules database 112 may permit use of media content 122 as training content for an ML or other AI model, or may permit use of media content 122 for training subject to specific conditions. Examples of such conditional permissions may include: (i) permission to train but must attribute training to media content 122 if used in whole or in part in final output, (ii) permission to train but must attribute training to media content 122 if used to guide or influence output; (iii) permission to train but limited to use of one or more of text, images, audio, video or derivative features of media content 122, (iv) permission to train and monetize, (v) permission to train but monetization prohibited, and (vi) permission to train but must notify owner of media content 122 upon new output (notification could be via web service, email, slack, etc.)

and then further actions could be taken by another system.

Continuing to refer to FIGS. 1 and 2A in combination, flowchart 240 further includes generating, based on the one or more rules governing use of media content 122, digital contract 124, such as a "smart contract" for example, specifying at least one of: (i) one or more constraints on use of media content 122, or (ii) one or more enablements on use of media content 122 (action 243). It is noted that, in some implementations, rather than specifying individual constraints or enablements on the use of media content 122 per se, digital contract 124 may instead include a policy statement describing the permissible use of media content 122, or point to the location at which that policy statement may be accessed. Such a policy statement may itself specify individual constraints or enablements on use of media content 122. It is further noted that digital contract 124 may govern the use of a single instantiation of media content 122 only, a plurality of instantiations of media content 122 only, all instantiations of media content 122 only, or a plurality of different items of media content including media content 122. Generation of digital contract 124, in action 243, may be performed by software code 110, executed by hardware processor 104 of system 100.

By way of example, in some implementations, digital contract 124 or a policy statement stored in media content usage rules database 112 may restrict use of media content 122 as training content for an ML or other AI model, such as by prohibiting use of media content 122 as training content for an ML or other AI model. Alternatively, or in addition, in some implementations rules or a policy statement stored in media content usage rules database 112 may permit use of media content 122 as training content for an ML or other AI model, or may permit use of media content 122 for training subject to specific conditions. Examples of such conditional permissions may include: (i) permission to train but must attribute training to media content 122 if used in whole or in part in final output, (ii) permission to train but must attribute training to media content 122 if used to guide or influence output; (iii) permission to train but limited to use of one or more of text, images, audio, video or derivative features of media content 122, (iv) permission to train and monetize, (v) permission to train but monetization prohibited, and (vi) permission to train but must notify owner of media content 122 upon new output (notification could be via web service, email, slack, etc.) and then further actions could be taken by another system.

It is also noted that the one or more constraints and/or enablements specified in digital contract 124 may apply to media content 122 in its entirety, or to a specific portion or portions of media content 122. For example, where media content 122 is or includes video, the one or more constraints and/or enablements specified in digital contract 124 may apply to scenes, shots, timecode intervals, or frames of the video. As used in the present application, the term "scene," as applied to video content and AV content, is a shot or series of shots that together deliver a single, complete and unified dramatic element of film narration, or block of storytelling.

Moreover, as used in the present application, the term "shot" refers to a sequence of frames of video that are captured from a unique camera perspective without cuts or other cinematic transitions.

Where media content 122 is or includes audio, the one or more constraints and/or enablements specified in digital contract 124 may apply to tracks or timecode intervals of the audio. Where media content 122 is or includes AV content, the one or more constraints and/or enablements specified in digital contract 124 may apply to only the audio portion of the AV content, only the video portion of the AV content, or to both the audio and video portions of the AV content. Where media content is or includes text, such as a digital book or digital comic book for example, the one or more constraints and/or enablements specified in digital contract 124 may apply to individual chapters, pages, line number intervals, comics panels, or digital file locations or intervals. It is further noted that in addition to specifying one or more constraints and/or enablements on the use of media content 122, digital contract 124 also includes the media ID of media content 122.

Continuing to refer to FIGS. 1 and 2A in combination, flowchart 240 further includes registering digital contract 124 with the media content ID of media content 122 in secure database 130 accessible over communication network 116 (action 244). As noted above, secure database 130 may take the form of a public secure database, such as any secure or securable database. Examples of secure databases may include Blockchain, Hashgraph, DAG, and HOLOCHAIN® ledgers, to name merely a few. Registration of digital contract 124 with the media content ID of media content 122 in secure database 130, in action 244, may be performed by software code 110, executed by hardware processor 104 of system 100.

Continuing to refer to FIGS. 1 and 2A in combination, flowchart 240 further includes generating, using an identifier of secure database 130, i.e., data identifying secure database 130, a first watermark (action 245). The data identifying secure database 130 and used in generating the first watermark, in action 245, may include a Uniform Resource Identifier (URI), such as a Uniform Resource Locator (URL), of secure database 130, for example. Generation of the first watermark, in action 245, may be performed by software code 110, executed by hardware processor 104 of system 100.

It is noted that watermarking is a way to add embedded information to media content by making use of the pixels or bits of the media file to hide the embedded information. This embedded information can be used to track the source of the file (in case of piracy) or to identify the creator, original owner, other previous owners, or the present owner of the file, as well as to identify secure database 130 on which digital contract 124 for media content 122 is registered.

Continuing to refer to FIGS. 1 and 2A in combination, flowchart 240 further includes embedding the first watermark into media content 122, the first watermark identifying secure database 130, to provide watermarked media content 126 (action 245). Watermarking of content 122, in action 246, may be performed by software code 110, executed by hardware processor 104 of system 100. It is noted that the first watermark used for watermarking of media content 122 in action 246 may be a visible watermark, such as a visual image applied to media content 122, or a humanly imperceptible watermark.

When embedding a humanly imperceptible watermark, for example, it may be advantageous or desirable to embed such a watermark in a high-resolution digital file having a high pixel or bit count, so that if a few pixels or bits are changed in the process of embedding the watermark that alteration will not distort the image visually or audibly. The objective of the watermark is to embed the identifier of secure database 130 in media content 122 without affecting its visual or audio qualities from the standpoint of human perception.

For the specific use case of media content 122 that is or includes video, humanly imperceptible watermarks can work by slightly varying the color values in the pixels of a video frame. A pixel is a fundamental visual unit of video frame composed of three color channels: red, green, and blue. By mixing various shades of red, green, and blue, every other color a computer can render can be generated so as to produce a video frame. One technique for embedding an imperceptible watermark into a video frame is by rounding these channel color values to the nearest even or odd number to embed information into the video frame. Odd numbers mean the underlying watermark pixel is white, while even numbers mean the underlying watermark pixel is black. Rounding these values to even or odd numbers actually changes the underlying image but in a way that is imperceptible to the naked eye. For example, it is very difficult for the human eye to discern the difference between a red shade designated by 177/255 and a red shade designated by 178/255. The technical term for this watermarking technique is least significant bit where information can be effectively embedded and hidden within media content by changing the minimum weighting value (rightmost bit) of binary numbers.

It is noted that for media content 122 that is or includes video, embedding the first watermark in media content 122, in action 246, may include embedding the first watermark in one or more video frames, or each video frame of media content 122, embedding the first watermark at least once within each shot of media content 122, or embedding the first watermark at least once within each scene of media content 122.

In the use case of media content that is or includes audio, a number of different well established techniques for generating audio watermarks are known in the art. For example, one technique adds watermarking sounds that are outside the human auditory spectrum to an audio file. Alternatively, a more robust technique is spread spectrum audio watermarking in which the watermark is distributed over the audio spectrum of the audio file. This technique embeds the audio watermark with the audio content, making it difficult to remove. In various implementations, whether the is generated as visual watermark or an audio watermark, the watermark could be a temporal-based watermark, i.e., the watermark must be extracted within a set time after watermarked media content 126 is accessed. The watermark is a visual watermark, the watermark could be a frame-based watermark.

In the use case of media content that is or includes text, embedding the first watermark in media content 122, in action 246, may include embedding the first watermark in one or more pages or comics panels, or embedding the first watermark at least once within each chapter. In some implementations, media content 122 received in action 241 may be previously watermarked media content including a watermark (hereinafter "second watermark"). In those implementations, hardware processor 104 of system 100 may further execute software code 110 to obtain the second watermark from media content 122. In those implementations, embedding the first watermark into media content 122, in action 246, occurs after obtaining the second watermark from the media content. For example, in some use cases, a creator of media content 122 may embed a watermark (i.e., the second watermark mentioned above) in media content 122 identifying the origin of media content 122. A subsequent owner of media content 122 may wish to restrict the future use of media content 122 and may interact with system 100 to have a digital contract or policy statement specifying one or more constraints and/or one or more enablements on use of media content 122 generated and registered on secure database 130. Another watermark (i.e., the first watermark mentioned above) identifying secure database 130 on which the digital contract for media content 122 is registered may then be embedded in media content 122, thereby enabling a future user of media content 122 to be informed of the permissible uses of media content 122.

It is noted that a significant advantage of the solution for providing secure digital registration of contracts governing media content disclosed in the present application over conventional solutions in which such constraints or enablements are embedded in or otherwise accompany media content itself 122 is that digital contract 124 may be modified at will in secure database 130 and those modifications can apply to all instantiations of media content 122 without having to make changes to metadata included in or with media content 122. Thus, in some implementations, the hardware processor 104 of system 100 may further execute software code 110 to modify the one or more constraints and/or enablements specified in digital contract 124.

Figure 2B:
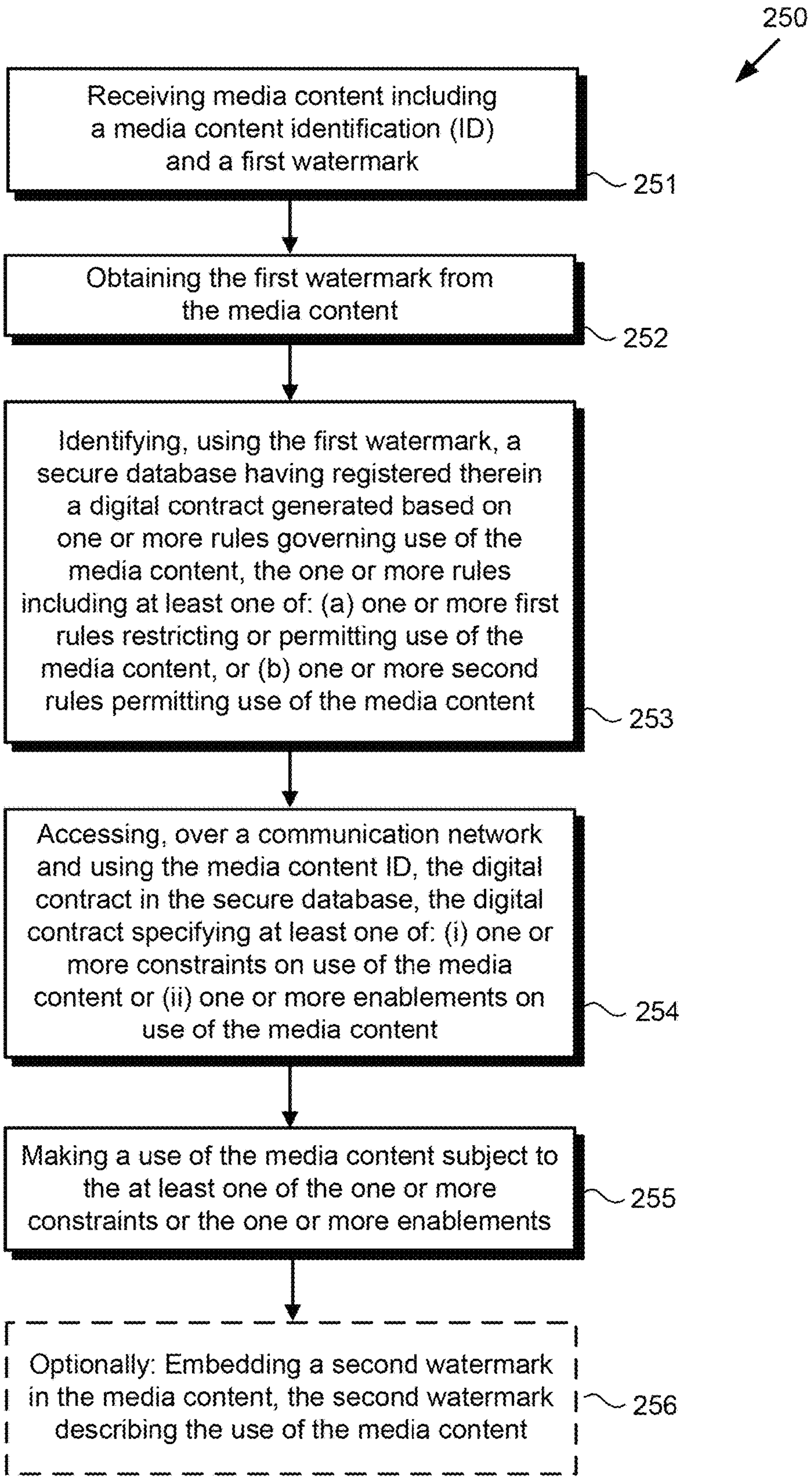
FIG. 2B shows a flowchart presenting an exemplary method for making use of media content subject to a digital contract securely registered using the method outlined in FIG. 2A, according to one implementation.

According to the method outlined by flowchart 240, an entity seeking to use media content 122, such as optional user system 160, receives watermarked media content 126, obtains the watermark, identifies secure database 130 on which digital contract 124 specifying one or more constraints and/or enablements on the use of media content 122 is registered, accesses the digital contract specifying the one or more constraints and/or enablements, and makes use of media content 122 subject to those one or more constraints and/or enablements. Moreover, in some use cases, user system 160 may then embed another watermark in media content 122, where that other watermark describes the use of media content 122 by user system 160. Such a process is outlined in FIG. 2B, which shows flowchart 250 presenting actions 251, 252, 253, 254, 255 and optional action 256 of an exemplary method for making use of media content 122 subject to a digital contract securely registered using the method outlined in FIG. 2A, according to one implementation.

Figure 3:
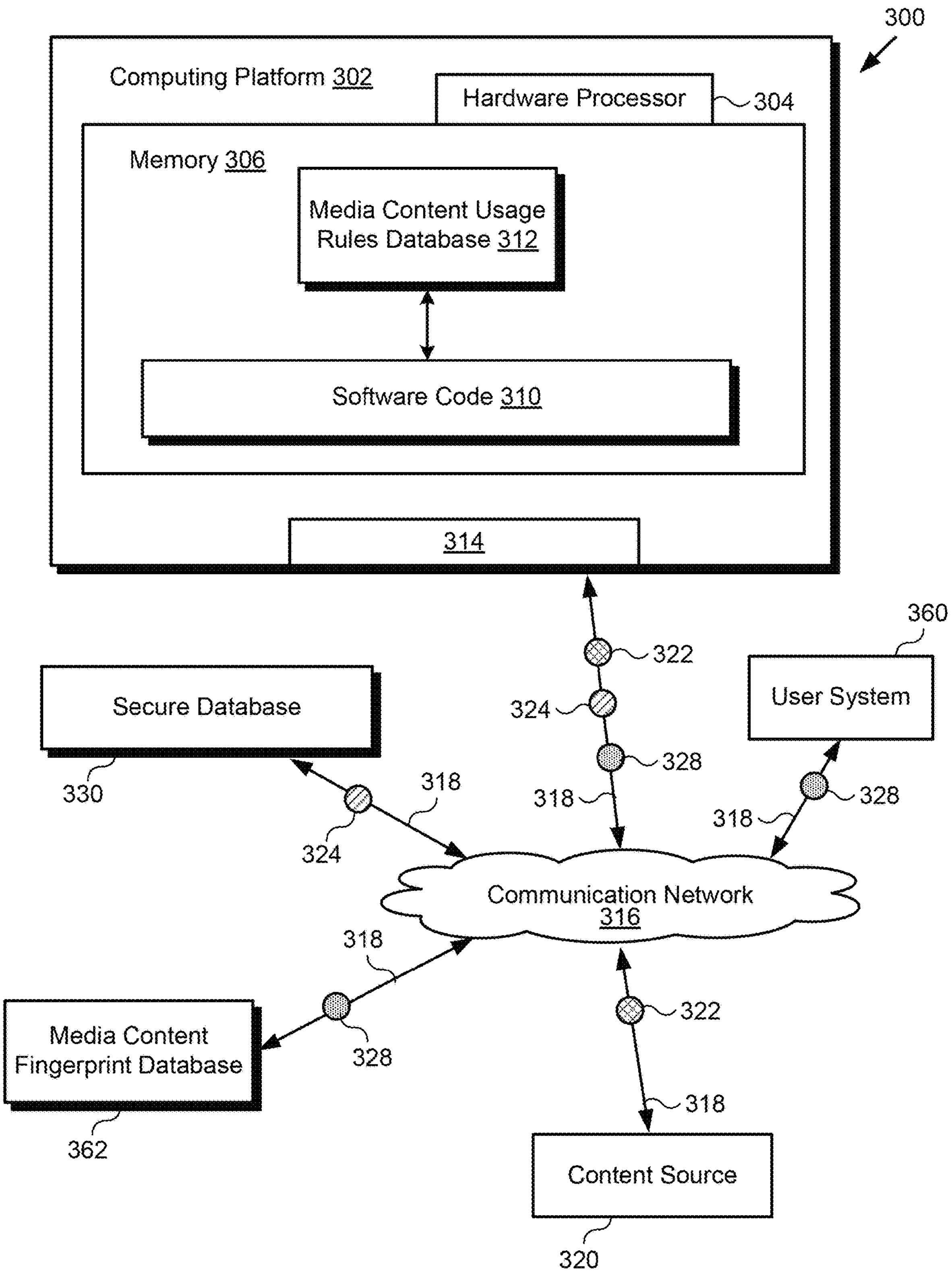
FIG. 3 shows a diagram of an exemplary system for providing secure digital registration of contracts governing media content use, according to another implementation.

Referring to FIG. 3, FIG. 3 shows a diagram of exemplary system 300 for providing secure digital registration of contracts governing media content use, according to another implementation. As shown in FIG. 3, system 300 includes computing platform 302 having transceiver 314, hardware processor 304, and memory 306 implemented as a computer-readable non-transitory storage medium. According to the present exemplary implementation, memory 306 stores software code 310 and media content usage rules database 312.

As further shown in FIG. 3, system 300 is implemented within a use environment including content source 320, secure database 330, optional user system 360, media content fingerprint database 362, communication network 316 and network communication links 318 communicatively coupling system 300, and optional user system 360, to content source 320, secure database 330 and media content fingerprint database 362. Also shown in FIG. 3 are media content 322 provided by content source 320, digital contract 324 specifying one or more constraints and/or enablements on the use of media content 322, and digital fingerprint 328 of media content 322 provided by system 300.

It is noted that system 300 including computing platform 302 having transceiver 314, hardware processor 304, and memory 306 storing software code 310 and media content usage rules database 312 corresponds in general to system 100 including computing platform 102 having transceiver 114, hardware processor 104, and memory 106 storing software code 110 and media content usage rules database 112, in FIG. 1. Consequently, computing platform 302, transceiver 314, hardware processor 304, memory 306, software code 310 and media content usage rules database 312 may share any of the characteristics attributed to respective computing platform 102, transceiver 114, hardware processor 104, memory 106, software code 110 and media content usage rules database 112 by the present disclosure, and vice versa.

In addition, communication network 316, network communication links 318, content source 320, media content 322, digital contract 324, secure database 330 and optional user system 360, in FIG. 3, correspond respectively in general to communication network 116, network communication links 118, content source 120, media content 122, digital contract 124, secure database 130 and optional user system 160, in FIG. 1. Thus, communication network 316, network communication links 318, content source 320, media content 322, digital contract 324, secure database 330 and optional user system 360 may share any of the characteristics attributed to respective communication network 116, network communication links 118, content source 120, media content 122, digital contract 124, secure database 130 and optional user system 160 by the present disclosure, and vice versa. That is to say, like secure database 130, secure database 330 may take the form of a public secure database, which may include any secure or securable database. Examples of such secure databases may include Blockchain, Hashgraph, Directed Acyclic Graph (DAG), and HOLOCHAIN® ledgers, to name merely a few.

Figure 4A:
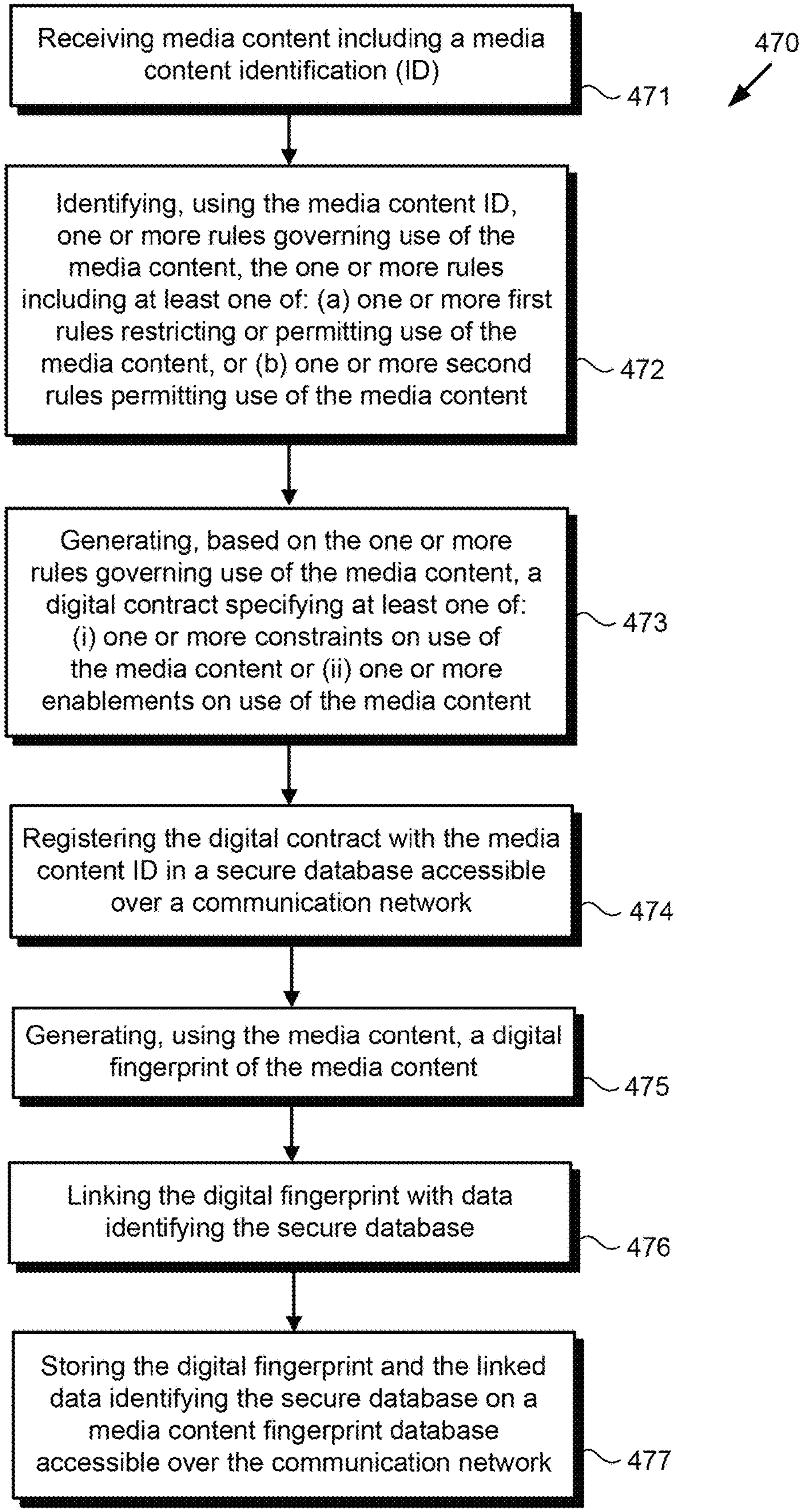
FIG. 4A shows a flowchart presenting an exemplary method for performing secure digital registration of contracts governing media content use, according to another implementation.

The functionality of system 300 and software code 310 will be further described by reference to FIG. 4A. FIG. 4A shows flowchart 470 presenting an exemplary method for performing secure digital registration of contracts governing media content use, according to another implementation. With respect to the method outlined in FIG. 4A, it is noted that certain details and features have been left out of flowchart 470 in order not to obscure the discussion of the inventive features in the present application.

Regarding flowchart 470, it is noted that actions 471, 472, 473 and 474 of flowchart 470 mirror respective actions 241, 242, 243, and 244 of flowchart 240, and will not be described in detail below. Referring to FIGS. 3 and 4A in combination, flowchart 470 moves from action 474 to generating, using media content 322, digital fingerprint 328 of media content 322 (action 475). Digital fingerprint 328 of media content 322 may be generated using any suitable digital fingerprinting technique known in the art. Generation of digital fingerprint 328 of media content 322, in action 475, may be performed by software code 310, executed by hardware processor 304 of system 300.

Figure 4B:
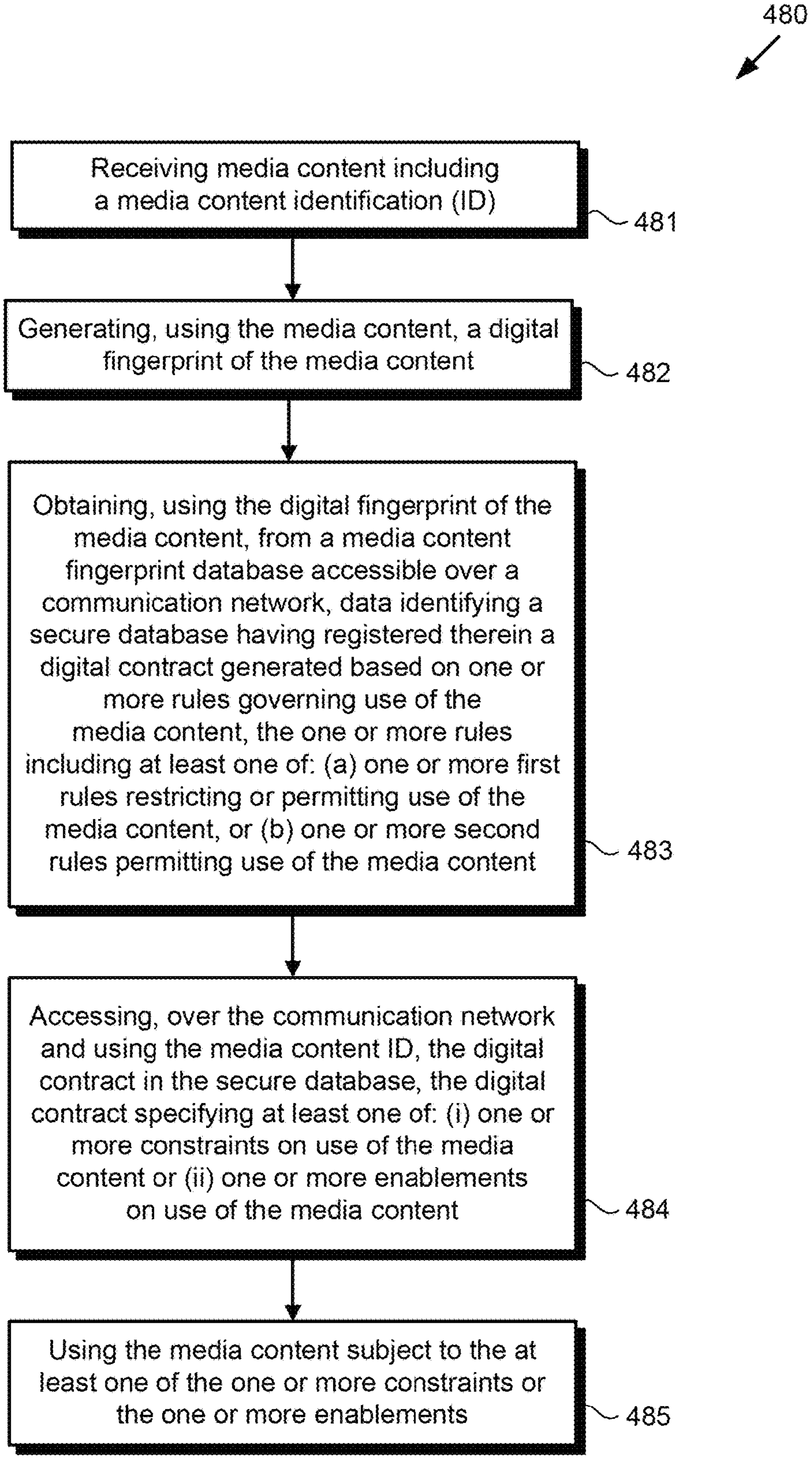
FIG. 4B shows a flowchart presenting an exemplary method for making use of media content subject to a digital contract securely registered using the method outlined in FIG. 4A, according to one implementation.

Continuing to refer to FIGS. 3 and 4 in combination, flowchart 470 further includes linking digital fingerprint 328 of media content 322 with an identifier of secure database 330, i.e., data identifying secure database 330 (action 476). The data identifying secure database 330 and linked with digital fingerprint 328 of media content 322, in action 476, may include the URI, such as the URL, of secure database 330, for example. Action 476 may be performed by software code 310, executed by hardware processor 304 of system 300.

Continuing to refer to FIGS. 3 and 4 in combination, flowchart 470 further includes storing digital fingerprint 328 of media content 322 and the linked identifying secure database 330 in media content fingerprint database 362 accessible over communication network 316 (action 477). Action 477 may be performed by software code 310, executed by hardware processor 304 of system 300.

As noted above, a significant advantage of the solution for providing secure digital registration of contracts governing media content disclosed in the present application over conventional solutions in which such constraints and/or enablements are embedded in or otherwise accompany media content itself 322 is that digital contract 324 may be modified at will in secure database 330 and those modifications can apply to all instantiations of media content 322 without having to make changes to metadata included in or with media content 322. Thus, in some implementations, the hardware processor 304 of system 300 may further execute software code 310 to modify the one or more constraints and/or enablements specified in digital contract 324.

According to the method outlined by flowchart 470, even in use cases in which media content 322 does not include a watermark, an entity seeking to use media content 322, such as optional user system 360, can check media content fingerprint database 362 to be directed to secure database 330 storing a digital contract 324 identifying the one or more constraints and/or entitlements on use of media content 322. That is to say, user system 360 seeking to use media content 322 may receive media content 322, may generate digital fingerprint 328 of media content 322, may use digital fingerprint 328 of media content 322 and media content fingerprint database 362 to identify secure database 330 on which digital contract 324 specifying one or more constraints and/or enablements on use of media content 322 is registered, may access the digital contract specifying the one or more constraints and/or enablements, and may make use of media content 322 subject to those one or more constraints and/or enablements. Such a process is outlined in FIG. 4B, which shows flowchart 480 presenting actions 481, 482, 483, 484 and 485 of an exemplary method for making use of media content 322 subject to a digital contract securely registered using the method outlined in FIG. 4A, according to one implementation.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a memory storing a software code; and a hardware processor configured to execute the software code to:

receive media content including a media content identification (ID);

identify, using the media content ID, one or more rules governing use of the media content, the one or more rules including at least one of: (a) one or more first rules restricting use of the media content, or (b) one or more second rules permitting use of the media content;

generate, based on the one or more rules governing use of the media content, a digital contract specifying at least one of: (i) one or more constraints on use of the media content, or (ii) one or more enablements on use of the media content;

register the digital contract with the media content ID in a secure database accessible over a communication network;

generate, using data identifying the secure database, a first watermark; and embed the first watermark into the media content, the first watermark identifying the secure database.

2. The system of claim 1, wherein the media content includes a second watermark, and wherein the hardware processor is further configured to execute the software code to:

obtain the second watermark from the media content; and wherein embedding the first watermark into the media content occurs after obtaining the second watermark from the media content.

3. The system of claim 1, wherein the one or more rules governing use of the media content restrict use of the media content as training content for a machine learning (ML) model or an artificial intelligence (AI) model.

4. The system of claim 1, wherein the one or more rules governing use of the media content prohibit use of the media content as training content for a machine learning (ML) model or an artificial intelligence (AI) model.

5. The system of claim 1, wherein the one or more rules governing use of the media content permit use of the media content as training content for a machine learning (ML) model or an artificial intelligence (AI) model, and require attribution of training to the media content when the media content is used in whole or in part in final output.

6. The system of claim 1, wherein the one or more rules governing use of the media content permit use of the media content as training content for a machine learning (ML) model or an artificial intelligence (AI) model, and require attribution of training to the media content when the media content is used to guide output or to influence output.

7. The system of claim 1, wherein the one or more rules governing use of the media content permit use of the media content as training content for a machine learning (ML) model or an artificial intelligence (AI) model, and limit the use to one or more of text, images, audio, video or derivative features of the media content.

8. The system of claim 1, wherein the one or more rules governing use of the media content permit use of the media content as training content for a machine learning (ML) model or an artificial intelligence (AI) model, and permit monetization of the ML model or the AI model after training using the media content.

9. The system of claim 1, wherein the one or more rules governing use of the media content permit use of the media content as training content for a machine learning (ML) model or an artificial intelligence (AI) model, and prohibit monetization of the ML model or the AI model after training using the media content.

10. The system of claim 1, wherein the one or more rules governing use of the media content permit use of the media content as training content for a machine learning (ML)

model or an artificial intelligence (AI) model, and require notification of an owner of the media content upon new output of the ML model or the AI model after training using the media content.

11. A system comprising:

a memory storing a software code; and a hardware processor configured to execute the software code to:

receive media content including a media content identification (ID);

identify, using the media content ID, one or more rules governing use of the media content, the one or more rules including at least one of: (a) one or more first rules restricting use of the media content, or (b) one or more second rules permitting use of the media content;

generate, based on the one or more rules governing use of the media content, a digital contract specifying at least one of: (i) one or more constraints on use of the media content or (ii) one or more enablements on use of the media content;

register the digital contract with the media content ID in a secure database accessible over a communication network;

generate, using the media content, a digital fingerprint of the media content;

link the digital fingerprint with data identifying the secure database; and store the digital fingerprint and the linked data identifying the secure database in a media content fingerprint database accessible over the communication network.

12. The system of claim 11, wherein the one or more rules governing use of the media content restrict use of the media content as training content for a machine learning (ML) model or an artificial intelligence (AI) model.

13. The system of claim 11, wherein the one or more rules governing use of the media content prohibit use of the media content as training content for a machine learning (ML) model or an artificial intelligence (AI) model.

14. The system of claim 11, wherein the one or more rules governing use of the media content permit use of the media content as training content for a machine learning (ML) model or an artificial intelligence (AI) model, and require attribution of training to the media content when the media content is used in whole or in part in final output, is used to guide output, or is used to influence output.

15. The system of claim 11, wherein the one or more rules governing use of the media content permit use of the media content as training content for a machine learning (ML) model or an artificial intelligence (AI) model, and limit the use to one or more of text, images, audio, video or derivative features of the media content.

16. The system of claim 11, wherein the one or more rules governing use of the media content permit use of the media content as training content for a machine learning (ML) model or an artificial intelligence (AI) model, and further permit monetization of the ML or the AI model after training using the media content.

17. The system of claim 11, wherein the one or more rules governing use of the media content permit use of the media content as training content for a machine learning (ML) model or an artificial intelligence (AI) model, and prohibit monetization of the ML or the AI model after training using the media content.

18. The system of claim 11, wherein the one or more rules governing use of the media content permit use of the media content as training content for a machine learning (ML) model or an artificial intelligence (AI) model, and require notification of an owner of the media content upon new output of the ML model or the AI model after training using the media content.

19. A method comprising:

receiving media content including a media content identification (ID);

identifying, using the media content ID, one or more rules governing use of the media content, the one or more rules including at least one of: (a) one or more first rules restricting use of the media content, or (b) one or more second rules permitting use of the media content;

generating, based on the one or more rules governing use of the media content, a digital contract specifying at least one of: (i) one or more constraints on use of the media content, or (ii) one or more enablements on use of the media content;

registering the digital contract with the media content ID in a secure database accessible over a communication network;

generating, using data identifying the secure database, a first watermark; and embedding the first watermark into the media content, the first watermark identifying the secure database.

20. The method of claim 19, wherein the one or more rules governing use of the media content permit use of the media content as training content for a machine learning (ML) model or an artificial intelligence (AI) model, and require attribution of training to the media content when the media content is used to guide output or to influence output.

* * * * *